United States Patent [19]

Shimizu

[11] Patent Number: 4,961,946

[45] Date of Patent: Oct. 9, 1990

[54] METHOD OF CRACKING FOR EGG SHELL

[75] Inventor: Yasuhiro Shimizu, Isehara, Japan

[73] Assignee: Toshin Technical Co., Ltd., Kanagawa, Japan

[21] Appl. No.: 322,741

[22] Filed: Mar. 13, 1989

[30] Foreign Application Priority Data

Sep. 7, 1988 [JP] Japan .................. 63-224240

[51] Int. Cl.⁵ .............................. A23J 1/00
[52] U.S. Cl. .................... 426/299; 99/568; 426/478
[58] Field of Search ............ 426/299, 478, 480; 99/568, 497

[56] References Cited

U.S. PATENT DOCUMENTS 3,958,505 5/1976 Baker ...................... 99/568
4,605,562 8/1986 Fujimura et al. ............ 426/478

FOREIGN PATENT DOCUMENTS 52-151775 12/1977 Japan .

Primary Examiner—George Yeung
Attorney, Agent, or Firm—Guy W. Shoup; Norman R. Klivans

[57] ABSTRACT

A method of cracking eggs in which many eggs are simultaneously cracked and fed onto a roasting pan or vessel quickly without breaking down of the shape thereof. The eggs are cracked by a cutter which ascends into an egg supporting frame through which a lower portion of each egg protrudes.

3 Claims, 3 Drawing Sheets

METHOD OF CRACKING FOR EGG SHELL

BACKGROUND OF THE INVENTION

1. Field of the Invention

This invention relates to a method of cracking eggs in which many eggs are simultaneously cracked and fed to a roasting pan or vessel in a short time without breaking down the shape thereof.

2. Description of the Prior Art

As to the conventionally employed method of cracking eggs, there are so far proposed a variety of methods, as typified by the method (not shown) in which washed eggs are transported to a cracking station sequentially and cracked.

In the above described method, the following problems are presented.

In the case of feeding many eggs onto a big roasting pan for roasting many fried eggs simultaneously (for example, roasting thirty six fried eggs), it is very difficult to quickly feed said many eggs onto said roasting pan, whereby a supply of said many eggs can not be provided by hand.

Further, in the case of cracking egg shell one by one according to said conventional method, the egg yolk goes to pieces when it is quickly cracked, and there is a limit of about 10,000 to 20,000 eggs/hour.

Further, according to said conventional egg cracking device, the length thereof is about 8 meters, so as to manually handle and eliminate yolks which fall to pieces.

OBJECT AND SUMMARY OF THE INVENTION

In view of these drawbacks of the prior art method, it is a principal object of the present invention to provide a method of cracking eggs in which many eggs are fed onto a roasting pan or vessel in a short time without breaking down the shape thereof.

A method of cracking eggs according to the present invention comprises a first step of putting a plurality of eggs onto an egg supporting frame which is mounted on a movable table 1 for supporting many eggs therein, a second step for cracking said eggs by a cutter when said egg supporting frame is positioned in a certain location by said movable table, whereby said eggs are simultaneously cracked and the yolk and the white of the eggs fall downwards.

In the method of cracking of the present invention, it is possible to crack simultaneously many eggs.

It is possible to slowly crack the eggs since many eggs are simultaneously cracked, whereby breaking of the yolk is reduced and a high cracking efficiency per hour is attained, and further the cracking rate is 100,000 eggs/hour, and the length of the apparatus is 1.5 meters.

Further, it is possible to instantaneously feed many yolks and whites onto a frying pan for producing many fried eggs.

DETAILED DESCRIPTION OF THE INVENTION

Figure 1:
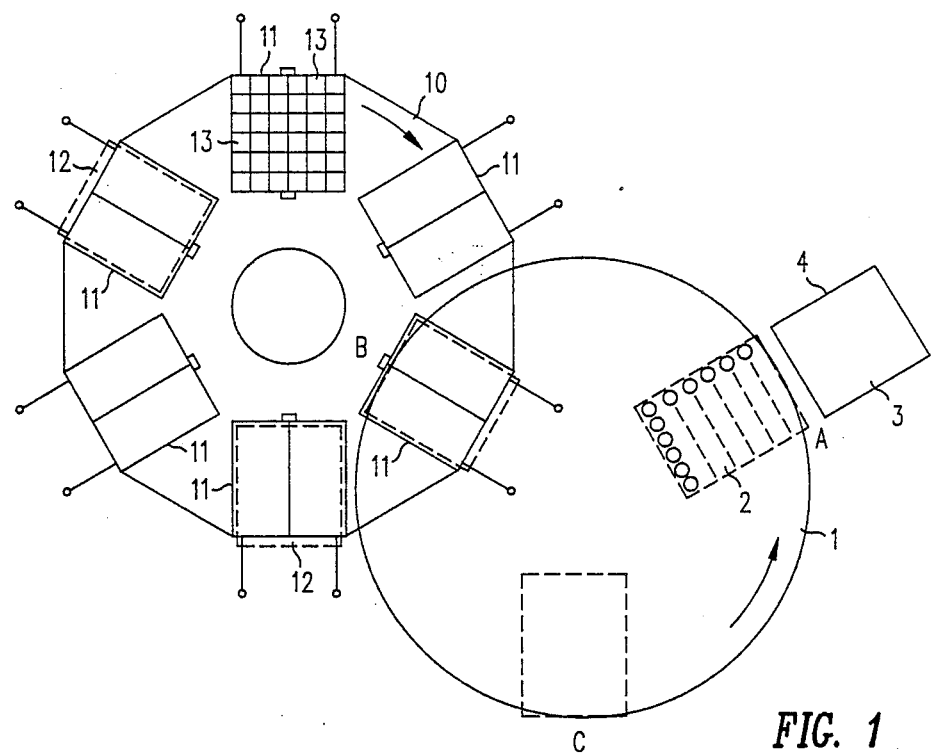
FIG. 1 shows a top view of the egg cracking machine.

A preferred embodiment of the method of the present invention will be hereafter explained by referring to the accompanying drawings.

Numeral 1 is a movable table in which three egg supporting frames 2 are disposed every 120°, an egg feeding means 4 for feeding many eggs (36 eggs in this embodiment) into said egg supporting frame 2 by a vacuum holding means 3 is disposed in an outer position of said movable table 1.

In said egg supporting frame 2, six holding grooves 5 are formed along a length thereof, a lower portion of each of said eggs extending from said holding grooves 5 when said eggs 6 are set in said holding grooves 5.

A cutter 8 having edge portions 7 corresponding to the number of eggs 6 is moved upwardly and downwardly by an electronic plunger in the direction of arrow A under said egg supporting frame 2 and said eggs 6 are simultaneously cracked by said edge portions 7 when said plunger 9 and said edge portion descend, whereby only the yolk and white move downwardly.

A rotary roasting table 10 is rotatably disposed, and a part of said rotary roasting table 10 is superimposed on a part of movable table 1, six roasting pans 11 are set on said rotary roasting 10, and a pair of heaters 12 are disposed on the upper position of said roasting pans 11 and said roasting table 10.

Figure 2:
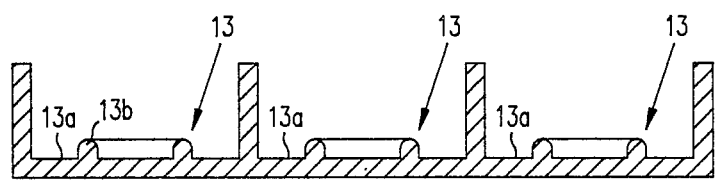
FIG. 2 shows a cross sectional view of a part of FIG. 1

In this embodiment, said roasting pan 11 is constructed to produce many fried eggs; there are thirty six roasting portions 13, a protruded ring 13b is formed on a center position of a bottom portion 13a as shown in FIG. 2, yolk 6a of eggs 6 is positioned in said ring 13b when a yolk and a white of an egg are supplied thereinto.

Figure 3:
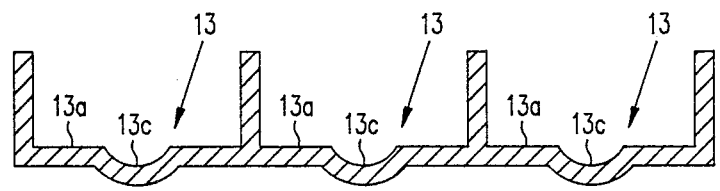
FIG. 3 shows a cross sectional view of another embodiment of FIG. 2.
Figure 4:
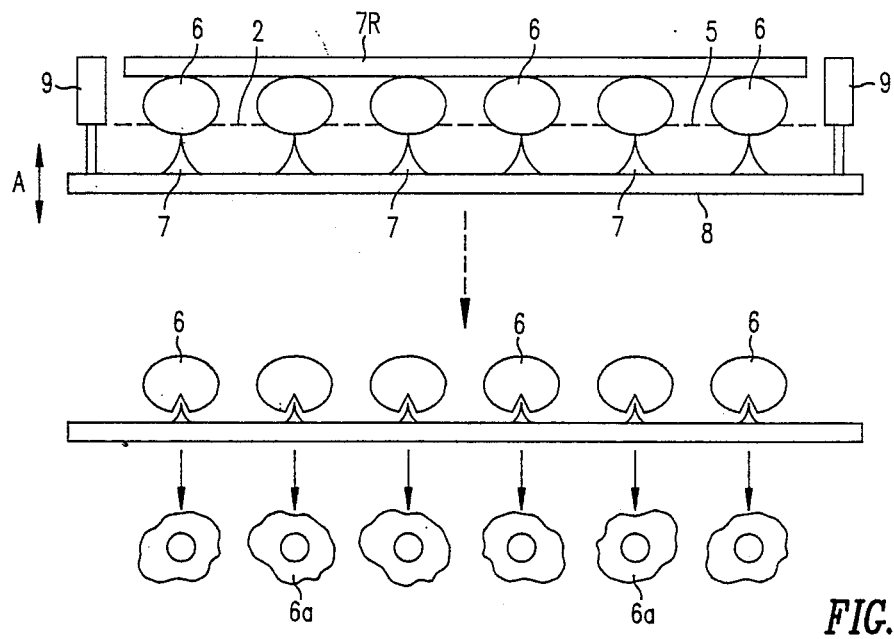
FIG. 4 shows cracking of eggs.

Further, FIG. 3 shows another embodiment, where a recess portion 13c is formed on a center position of said bottom portion 13a, and a yolk is positioned in said recess portion 13c.

Referring now to the method of cracking eggs:

In "A" position of FIG. 1, the vacuum holding means 3 holding thirty six eggs moves the eggs by said vacuum holding means 3 onto said egg supporting frame 2; when the vacuum is cut off said eggs 6 which are held by said vacuum holding means 3 are set on said egg supporting frame 2.

Next said movable table is rotated as shown by the arrow and is stopped at "B" position in which said movable table 1 is in position relative to said roasting pan 11, and after that said electric plunger is operated, whereby said cutter 8 is moved upwardly and said eggs 6 are cracked by said edge portions 7, yolk and white 6a fall onto said roasting portions 13, and a yolk is positioned in said protruded ring 13b or recess portion 13c. Further, in said condition, said eggs 6 are cracked so that an upper portion of said eggs 6 are softly pressed by a rubber plate 7R.

After that, a roasting operation is started, and said rotary roasting table 10 is rotated along the direction of the arrow, and an upper portion of the eggs is roasted by a pan heater 12.

Further, said egg supporting frame 2 accepts eggs at "A" position, a cracking operation is performed at "B" position, and egg shells are eliminated by an eliminator (not shown) at "C" position.

At that time, said egg supporting frame 2 at "C" position moves to "A" position, and a feeding of the eggs is repeatedly performed.

Rotation of said movable table 1 and rotary roasting table 10 are synchronized.

Further, in the case of using a vessel (not shown) instead of said roasting pan 11, yolk and white 6a are housed in said vessel. Further, it is possible for thirty six fried eggs in said roasting pan 11 to be frozen instantaneously by a freezer (not shown).

Further, the number of eggs is not limited to thirty six; this number is according to the machine design.

Figure 5:
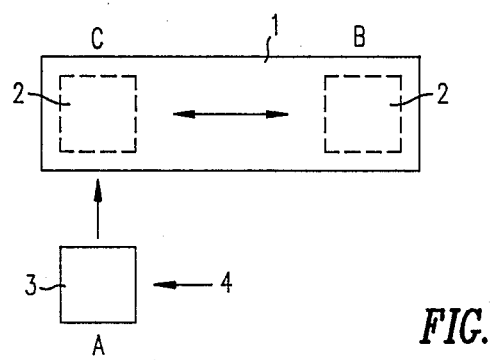
FIGS. 5 to 7 show other embodiments.
Figure 6:
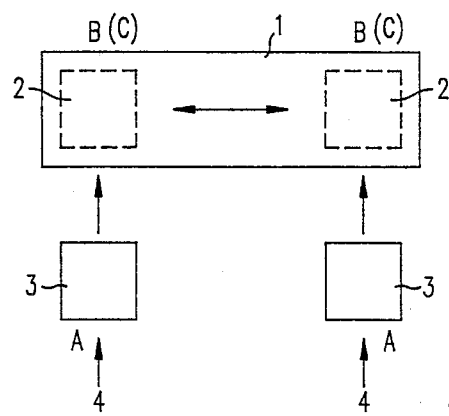
Figure 7:
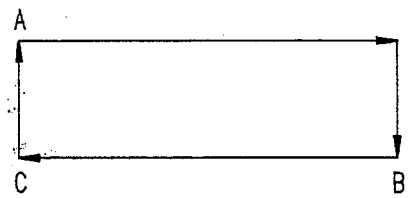

FIGS. 5 to 7 show other embodiments in which said movable table 1 is modified to be a linear movable type and a vertically rotatable type.

In FIG. 5, feeding of eggs is performed at "A" position, cracking of eggs is performed at "B" position, and elimination of egg shells is performed at "C" position.

In FIG. 6, it is possible to perform feeding and cracking of eggs at both end portions of said movable table 1, and elimination of egg shells is performed at said both end portions.

Namely, a feeding of eggs is performed at one end thereof, and cracking and elimination of egg shells are performed alternatively.

In FIG. 7, said movable table 1 is vertically rotated, feeding of eggs is performed at "A" position, cracking of egg is performed at "B" position, and eliminating of egg shells is performed at "C" position.

Figure 8:
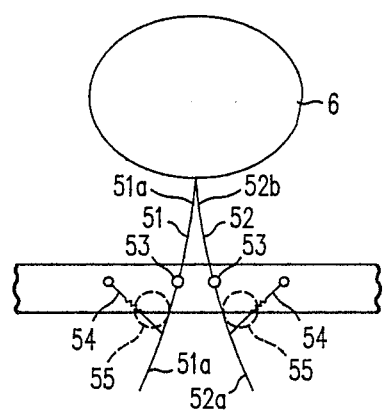
FIGS. 8 and 9 show another embodiment.
Figure 9:
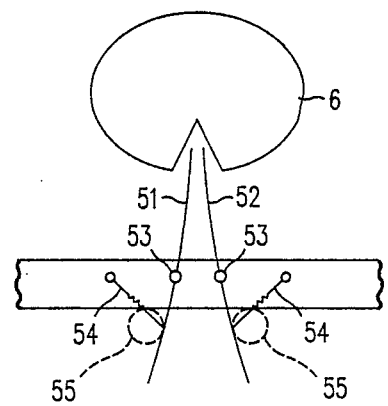

FIGS. 8 and 9 show another embodiment of the present invention, in which a pair of edge members 51 and 52 are rotatably mounted to a bar member 50 which are upwardly and downwardly movable via pivot portion 53, and end portions 51a and 52a of said edge members 51 and 52 are contacted by a force of spring member 54 and from a cut portion for eggs 6.

Further, a pair of cams 55 which are fixedly mounted to a stationary member (not shown) contact said edge members 51 and 52, and said edge members 51 and 52 are opened according to an ascent of said bar member 50.

In FIG. 8, egg 6 is cracked and opened in FIG. 9, and a yolk and white fall downwards.

What we claimed is:

1. A method cracking eggs comprising the steps of:
   providing a supporting frame;
   placing a plurality of eggs onto the supporting frame, a lower portion of each egg overlying an opening defined by the supporting frame;
   providing a cutter underlying the supporting frame;
   moving the cutter upwards so as to contact the lower portion of each egg thereby cracking each egg; and
   moving the cutter downwardly thereby allowing the yolk and white of each egg to drain downwards through the opening.

2. The method of claim 1, further comprising the step of rotating the supporting frame, after the step of moving the cutter downwards.

3. The method of claim 1, further comprising, prior to the step of moving the cutter upwards, the steps of:
   providing a resilient plate overlying the eggs; and
   moving the resilient plate into contact with an upper portion of each of the eggs, thereby holding the eggs in the supporting frame.

* * * * *